United States Patent [19]

Durrett et al.

[11] Patent Number: 5,048,348

[45] Date of Patent: Sep. 17, 1991

[54] FLUID FLOW VOLUMETRIC DETERMINATION APPARATUS AND METHOD

[75] Inventors: Michael G. Durrett; Earl L. Dowty, Katy; Gregory J. Hatton, Houston, all of Tex.

[73] Assignee: Texaco Inc., White Plains, N.Y.

[21] Appl. No.: 478,898

[22] Filed: Feb. 12, 1990

Related U.S. Application Data

[63] Continuation-in-part of Ser. No. 310,972, Feb. 14, 1989, abandoned.

[51] Int. Cl.⁵ .......................... G01F 1/74; G01F 15/08
[52] U.S. Cl. .................................. 73/861.04; 73/200
[58] Field of Search ................. 73/861.04, 200, 861.61

[56] References Cited

U.S. PATENT DOCUMENTS 4,760,742  8/1988  Hatton .............................. 73/200 X
4,829,831  5/1989  Kefer et al. .................. 73/861.04 X Primary Examiner—Herbert Goldstein
Attorney, Agent, or Firm—Robert A. Kulason; James J. O'Loughlin; Robert B. Burns

[57] ABSTRACT

A system and method for obtaining a rapid determination of the volumetric flow rate of a multi-phase fluid stream comprised of crude oil, water and gas. The gaseous component of the stream is first segregated to allow a measurement of the volumetric relationship between the respective liquid phases. Thereafter, the density of the remaining liquids is made. Translation of the values obtained by such measurements permits the system to function at a remote source of the multi-phase fluid.

9 Claims, 1 Drawing Sheet

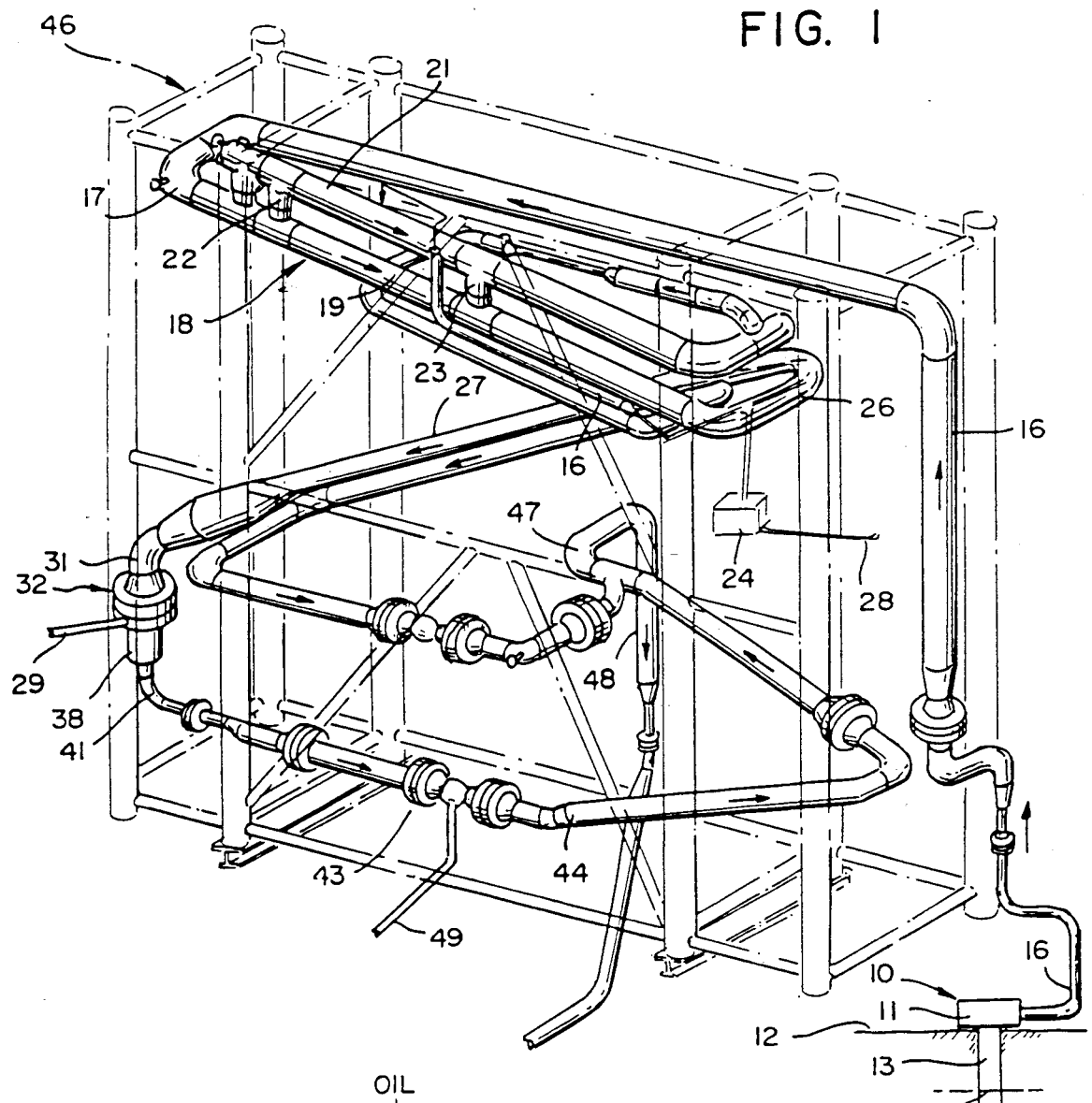

and a subterranean source is determined. It relates particularly to an off-
FLUID FLOW VOLUMETRIC DETERMINATION APPARATUS AND METHOD This application is a continuation-in-part of our previously filed application Ser. No. 07/310,972, filed Feb. 14, 1989, now abandoned.

BACKGROUND OF THE INVENTION

This invention relates to an operation in which the volume flow, of a hydrocarbon fluid produced from a source is determined. It relates particularly to an offshore operation in which a multi-phase hydrocarbon fluid is produced from one or more wells at the ocean floor. Normally, the effluent, or product of such an operation consists of a multi-phase flow comprising gas, water and a liquid hydrocarbon such as crude oil.

The effluent stream, after being produced from the well is either manifolded or accumulated into a storage means, or a pipeline for transmission directly to shore. At the latter, the produced stream is introduced to an apparatus which separates the liquid from the gaseous component. The discrete streams can then be separately treated or handled as needed.

In any event an essential facet of such an operation is the desirability of being able to determine with a reasonable degree of accuracy, the volume flow of the different fluid phases. More particularly, the volumetric flow of liquid produced, normally consists of an amount of non-usable water, which is produced concurrently with the usable crude oil.

A notable disadvantage, experienced when dealing with underwater equipment, is that the produced liquids are frequently piped for a considerable distance from the source or well, before measurements can be taken to determine volumetric flow rates.

STATEMENT OF THE INVENTION

Toward overcoming the stated problems associated with such an operation, the present invention is addressed to a system for determining the volumetric flow rate of a multi-phase hydrocarbon production stream. This is achieved directly at a wellhead or at a manifold into which the entire production stream has been collected. The system functions to provide an accurate means for measuring the volumetric flow of the liquids including both water and oil. It further functions to measure the separated gaseous component.

The source of the liquid being measured can be received as noted from a single well. It can also come from a plurality of wells whose aggregate production streams are directed or pipelined to a common gathering point. The latter as noted, can be comprised of a subsea manifold such as a template structure through which a plurality of wells are formed, thus permitting the respective offshore wellheads to be closely positioned.

The well's effluent, or production stream, regardless of the source from which it is produced will include one or more hydrocarbon liquids together with gas and natural or injected water. The latter will be present in varying proportions depending primarily on the characteristics of the subterranean reservoir from which it was taken.

To illustrate the instant invention, but not however to impose an unwarranted limitation, the well effluent or production stream will be considered to have issued from a single offshore well. The composition of the multi-phase stream will include amounts of one or more hydrocarbon liquids such as crude oil, together with water which has been carried from the reservoir in the liquid stream, as well as reservoir gases.

Toward achieving the desired degree of accuracy, the composite production stream is preferably measured immediately at the wellhead, or as close thereto as is feasible, rather than making the measurements remotely from the well. To assure accuracy of the liquid measurement and readings, substantially all of the gaseous component is initially separated from the liquid phase and measured separately. The composite liquid will then be substantially, although perhaps not completely free of the gaseous component without impairing subsequent volumetric determination. Regarding terminology "by substantially free" is meant that the disclosed system will assume the volume of a liquid product even after the separation step, but still retains up to 15% to 20% of the gaseous component.

The substantially gaseous free liquid stream is introduced through a conduit which is associated with a water cut monitor. At this point, the mathematical relationship of the liquid between water and oil content is determined. The composite flow is then directed to the inlet of a constraint meter, which is maintained under a pressure head of the liquid, to permit a determination of the pressure differential across a constricted opening within said meter. The multi-liquid stream is now conducted to means for determining its density.

Stated otherwise, a continuous fluid flow path apparatus is provided comprised of means to separate the fluid stream into liquid and vapor phases. The liquid is passed sequentially through:

a) means to determine the volumetric relationship between water and hydrocarbon liquid in the stream and to furnish a signal to reflect said relationship, b) means to determine the pressure differential created by the composite liquid as it flows through an orifice, and means for reflecting said differential in a transmittable signal, c) density measuring means to receive the composite liquid and to furnish a signal indicative of the liquid's density.

The respective data indicating signals are then introduced into a formula to determine the desired volumetric flow rate.

It is therefore an object of the invention to provide means and method for measuring the flow rate of a liquid production stream, directly at the wellhead, which stream includes at least one hydrocarbon liquid, as well as water together with an amount of reservoir gas.

DESCRIPTION OF THE DRAWINGS

FIG. 1 illustrates diagrammatically the apparatus of the present system indicating the flow paths of the fluid streams.

FIG. 2 is a cross-sectional view taken along line 2—2 of FIG. 1.

Referring to the drawings, FIG. 1 illustrates the present multi-phase fluid flow monitoring and measuring system as incorporated into a subterranean well 10 having a wellhead 11. The latter is normally supported at the ocean or sea floor 12 on a length of conductor pipe or casing 13. Said pipe is embedded into the substrate a sufficient distance to communicate with a subterranean hydrocarbon holding reservoir 14.

As a practical consideration, well 10 is normally formed in a vertical position within the hydrocarbon holding reservoir 14. Preferably, the latter incorporates sufficient gas pressure to permit natural production of liquid hydrocarbon from reservoir 14. Depending on the composition of the substrate, and upon other factors, a produced stream or effluent at wellhead 11, will normally be made up, as previously noted, of at least one hydrocarbon liquid, one or more gases, and water.

If the volume of produced gas is sufficiently large to be collected for commercial or economic reasons, it will be stored. It may however, if present in a limited quantity, be disposed of by flaring or by a similar disposal process. In any event, the composite liquid stream is conducted from wellhead 11 by conductor or conduit 16. It is appreciated that this flow will be controlled by wellhead valving or by an appropriate choke means which functions to regulate fluid flow from well 10.

Conductor 16 is communicated with the upstream or elevated end 17 of a liquid/gas separator 18. The latter includes a first tubular or main vessel 19 comprised primarily of an elongated first tubular member for receiving the composite liquid at its elevated inlet 17. A second tubular member 21 spaced upwardly from said first tubular 19, is communicated with the latter at one or more spaced apart transfer passage 22 and 23.

Functionally, as the composite liquid/gaseous product flows from conduit 16 into separator 18, vessel 19 directs the flow downwardly to promote a gradual, gravitational separation of the multi-phase components. The gaseous component will thereby rise from the flowing stream and be directed through transfer passages 22 and 23 into tubular member 21. This initial separation will ordinarily remove substantially all of the gas from the liquid segment, although not completely.

To establish the relative proportion of oil to water in the substantially gas free liquid, the latter is continuously monitored whereby the relationship can be constantly determined between these two liquids. A number of such procedures and apparatus therefor are known in the art, which are capable of providing to varying degrees, the effective relationship of hydrocarbon liquid with the water in the stream. In one such operation, a water cut monitor 24 is positioned cooperatively with secondary conduit 26 which carries a sample stream of the combined liquids.

Water cut monitor 24 is disclosed and claimed in U.S. Pat. No. 4,499,418, Helms et al., dated Feb. 12, 1985. In this patent, means is disclosed of a microwave transmitter which functions to transmit microwave energy through the water/oil stream. The transmitted energy, as a result of its traverse through the multi-liquid stream, provides an indication of the water fraction of the mixture.

Physically, the microwave transmitter is comprised of transmitting and receiving means positioned adjacent to, or in association with, but external to the liquid carrying stream conduit 26. Functionally, the microwave transmissions pass through the walls of conduit 26 as well as through the multi-liquid stream. The resulting difference forms the basis of a generated signal.

Separator main vessel 19 is preferably arranged in a downwardly tilted or sloping disposition to allow substantially gas free liquid flow along a downcomer 27 to inlet 31 of constraint meter 32. The latter will thus accumulate the liquid at its upstream side, thereby functioning under a continuous head of the liquids as a result of back pressure buildup due pressure loss in the constraint meter and associated piping which conduct the liquid to the point where the gas and liquid are recombined at (47).

Referring to FIG. 3, in constraint meter 32, liquid enters a large diameter (d1) first or upstream compartment 33 preferably flowing at a Reynold's number of 10,000 or greater. Said compartment 33 includes a constricted outlet port 34 (d2) defined by annular shoulder 36. The latter is preferably disposed normal to the longitudinal axis of the liquid flow passage through meter 32. Liquid flow will then pass at an increased velocity through the reduced diameter outlet port 34, into discharge conduit 38.

Pressure differential of the stream established across annular shoulder 36 is indicated at a pressure differential meter 39. The latter is connected with one leg 41 communicated with compartment 33 at a distance (h1) from a downstream datum line D. A second leg 42 is communicated with smaller diameter conductor 38, downstream of constricted opening 34 (d2), a distance (h2) from datum line D.

In summary, to achieve the desired pressure relationship across annular shoulder 36, pressure taps 41 and 42 are spaced distances $h_1$ and $h_2$, respectively from a common datum line D downstream of shoulder 36. Said meter further includes means for generating or establishing a signal indicative of the measured pressure differential. Following normal practice, the respective legs 41 and 42 are comprised of liquid filled capillary tubes which extend from the sensing points, to the remotely positioned differential pressure meter 39.

After emerging from constraint meter 32, the liquid stream is directed through conduit 35 to inlet 41 of densitometer 43 in which the density of the combined liquid stream is determined. The density of the liquid is converted into a signal capable of being transmitted.

As shown in FIG. 1, the disclosed system is utilized in a subsea environment where it will monitor production flow directly at wellhead 11. The system is conveniently incorporated into a suitable support framework 46 or a similar arrangement for positioning the various valves, measuring equipment and signal conductors.

To assure its proper functioning, framework 46 can be anchored to the ocean floor either permanently or by means which will permit it to be removed for use at an alternate location.

It is further appreciated that because of the inaccessibility of the disclosed subsea system, means is provided for transmitting information and data in the form of generated signals from the various instruments, to the water's surface where they might be utilized. Thus, while not shown in detail, the necessary wiring and related transmission equipment can be associated with each instrument such as water cut monitor 24, constraint meter 32 and densitometer 43. The necessary signal transmission means, or cables are preferably carried in rigid wall conduits such as conduit 28 which depends from water cut meter 24 which encloses a plurality of wires. Conduit 29 similarly depends from constraint meter 32, and conduit 49 depends from densitometer 43.

The respective conduits 28, 29 and 49 are formed to intersect at a common terminal. Here the necessary electrical connections are made whereby all the signals can be conducted to the water's surface by way of a shielded cable to a suitable meter or computer which is capable of utilizing the desired signals.

From these meter readings which are taken during a multi-phase fluid flow monitoring period, the generated signals can be transmitted to a surface based computer or other recorder means. As a practical measure, such wiring is most conveniently laid onto, or beneath the ocean floor 12 adjacent to wellhead 11 to assure its safety.

Referring again to FIG. 2, means is shown for determining the desired volumetric flow rate Q, and consequently the mass flow rate of the produced fluid stream. The following formula when incorporating the signal data derived from the various measuring points in the system, will provide a desired high degree of accuracy with respect to the volumetric flow of the fluid.

$$Q = C_f K_{geom} \left\{ g \left[ \frac{\Delta P_m}{\rho g} + (h_1 - h_2)\left(1 - \frac{\rho m}{\rho}\right) \right] \right\}^{\frac{1}{2}}$$

in which:
Q = volumetric flow rate of stream
$C_f$ = emperically determined coefficient $$K_{geom} = \left\{ \frac{4}{3 - 2\left(\frac{d_2}{d_1}\right)^4 - \left(\frac{d_2}{d_1}\right)^2} \right\}^{\frac{1}{2}} \left\{ \frac{\pi}{4}(d_2)^2 \right\}$$

$d_1$ = large diameter of constriction
$d_2$ = small diameter of constriction
g = acceleration due to gravity (32.2 ft/sec.$^2$)
$P_m$ = differential pressure gauge reading
$\rho$ = density of flowing liquid
$\rho_m$ = density of fluid in p meter's sensor legs 2
$(h_1 - h_2)$ = vertical distance between static pressure port in large diameter and small diameter sections of the constraint meter.

$$Q = C_f K_{geom} g \left\{ \left[ \frac{\Delta P_m}{\rho g} + (h_1 - h_2)\left(1 - \frac{\rho m}{\rho}\right) \right] \right\}^{\frac{1}{2}}$$

in which:
Q = volumetric flow rate of stream
$C_f$ = emperically determined coefficient $$K_{geom} = \left\{ \frac{4}{3 - 2\left(\frac{d_2}{d_1}\right)^4 - \left(\frac{d_2}{d_1}\right)^2} \right\}^{\frac{1}{2}} \left\{ \frac{\pi}{4}(d_2)^2 \right\}$$

$d_1$ = large diameter of constriction
$d_2$ = small diameter of constriction
g = acceleration due to gravity (32.2 ft/sec.$^2$)
$P_m$ = differential pressure gauge reading
$\rho$ = density of flowing liquid
$\rho$ = density of fluid in the differential pressure meter's remote sensor capillary tubes
$(h_1 - h_2)$ = vertical distance between static pressure port in large diameter and small diameter sections of the constraint meter.

From densitometer 43, the multi-liquid stream is conducted through conduit 44 to a junction with conduit 47 which carries the gaseous flow phase. Thus, the respective liquid and gaseous phases are recombined to be directed by conductor 48 to a terminal or destination point through a pipeline.

It is understood that although modifications and variations of the invention can be made without departing from the spirit and scope thereof, only such limitations should be imposed as are indicated in the appended claims.

We claim:

1. System for determining the volumetric flow rate of a multi-phase production stream at the well head (11) of a producing well (13) communicated with a subterranean reservoir (14), which holds at least one hydrocarbon liquid, water, and a gaseous component, said system defining a fluid flow path including:

a fluid separator means (18) communicated with said well head (11) to receive a multi-component production stream from said well (13) comprised of said at least one hydrocarbon liquid, water and a gaseous component, vapor receiving means (21) communicated with said fluid separator means (18) to receive the gaseous component which separates from said multi-component production stream, monitor means (24) associated with the downstream end of said separator means (18), to monitor the substantially gas-free, production stream, and to provide a first signal indicative of the volumetric relationship between the hydrocarbon liquid and the water content of said stream, a constraint meter (32) having an inlet (31) communicated with said fluid separator means (18) said constraint meter (32) having a constricted segment (38), and means for determining the pressure differential established by the substantially gas-free liquid stream which flows through said constricted segment (38), for providing a second signal indicative of said pressure differential, and densitometer means (43) communicated with said constraint meter (32) to receive said substantially gas-free liquid stream therefrom, to provide a third signal indicative of the density of said liquid stream flowing therethrough.

2. In the system as defined in claim 1, including: conduit means (44) communicating said separator means (18) with the downstream side of said densitometer means (43) to reform said substantially gas-free liquid production stream with said gaseous component from said vapor receiving means.

3. In the system as defined in claim 1, wherein said first separating conductor vessel (19) is comprised of an elongated conductor disposed in a tilted position to receive said composite multi-component fluid stream at the upper end thereof, and to conduct a gaseous component free stream to the said first conductor (19) lower end.

4. In the system as defined in claim 1, including a plurality of flow risers (22, 23) spaced longitudinally of said fluid separating means (18), each being communicated with said vapor receiving means (21).

5. In the system as defined in claim 1, wherein said constraint meter (32) constricted segment (38) defines an orifice therein forming a constricted flow passage.

6. In the system as defined in claim 1, wherein said constraint meter (32) constricted segment (38) includes a sharp edged orifice.

7. In the system as defined in claim 1, including a structural frame (46) supporting said fluid flow path defining elements above the sea floor (12).

8. In the system as defined in claim 1, wherein said monitor means (24) includes a water cut monitor.

9. Method for determining the volumetric flow of a pressurized effluent flowing from a subterranean well producing a composite fluid stream comprised of a hydrocarbon liquid, water, and a gaseous component, said method including the steps of:

providing a continuous fluid flow path apparatus including sequentially arranged means to
  (a) form a substantially vapor free liquid stream,
  (b) determine the volumetric relationship between the liquids in said stream,
  (c) determine the pressure differential established by the liquid stream as it flows through an orifice utilizing a differential pressure meter with remote sensor capillary tubes and
  (d) determine the density of the composite liquid, separating the gaseous component from the composite liquid stream to form a substantially gas free stream, determining the volumetric relationship between the hydrocarbon and the water present in said gas free stream, determining the pressure differential exhibited by said gas free liquid stream as the latter flows across an orifice meter, and determining the density of said gas free liquid, and determining the volumetric flow of said effluent stream in accordance with the following mathematical relationship.

$$Q = C_f K_{geom} \left\{ g \left[ \frac{\Delta P_m}{\rho g} + (h_1 - h_2)\left(1 - \frac{\rho_m}{\rho}\right) \right] \right\}^{\frac{1}{2}}$$

in which:

$Q$ = volumetric flow rate of stream
$C_f$ = emperically determined coefficient $$K_{geom} = \left\{ \frac{4}{3 - 2\left(\frac{d_2}{d_1}\right)^4 - \left(\frac{d_2}{d_1}\right)^2} \right\}^{\frac{1}{2}} \left\{ \frac{\pi}{4} (d_2)^2 \right\}$$

$d_1$ = large diameter of constriction
$d_2$ = small diameter of constriction
$g$ = acceleration due to gravity (32.2 ft/sec.$^2$)
$P_m$ = differential pressure gauge reading
$\rho$ = density of flowing liquid
$\rho_m$ = density of fluid in differential pressure meter's remote sensor capillary tubes
$(h_1 - h_2)$ = vertical distance between static pressure port in large diameter and small diameter sections of the constraint meter.

* * * * *